(12) United States Patent
Bae (10) Patent No.: US 6,359,358 B1
(45) Date of Patent: *Mar. 19, 2002

(54) MAGNETIC CIRCUITS IN THE ROTATION SYSTEM FOR GENERATING BOTH THE MECHANICAL POWER AND THE ELECTRIC POWER

(76) Inventor: Youn Soo Bae, 170-57, Yuljun-dong, Jangan-gu, Suwon, Kyunggi-do, 440-320 (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/011,697
(22) Filed: Feb. 12, 1998

(30) Foreign Application Priority Data

Aug. 16, 1995 (KR) .......................................... P95-25183

(51) Int. Cl.[7] .............................................. H02K 47/20
(52) U.S. Cl. ...................................................... 310/113
(58) Field of Search ................................ 310/112, 113; 318/727

(56) References Cited

U.S. PATENT DOCUMENTS 4,093,869 A    6/1978  Hoffmann et al. ............ 290/31
5,350,991 A    9/1994  Bae ............................ 318/727

FOREIGN PATENT DOCUMENTS

WO    WO 91/11051    *  7/1991

* cited by examiner

*Primary Examiner*—Karl Tamai
(74) *Attorney, Agent, or Firm*—Ladas & Parry (57) ABSTRACT

Magnetic circuits in rotation systems for generating electric and mechanical power such as machines in electric cars and ships. This rotation system is composed of three parts. One is a revolving field magnet (22) fixed at the axis (21). The second part is armatures with M type of magnetic circuits for generating the mechanical power. The third part is armatures with inverse Y type of eletromagnets for generating the electric power that generates the electromotive force by receiving the induced magnetic flux from the revolving field magnet (22) and the armatures for generating the mechanical power. The M type magnetic circuits and the inverse Y type of electromagnets are separated by air gaps. With this, we have an efficient motor/generator since it can reduce the external power consumption since a part of the mechanical power is recycled by a switched electrical damping effect.

17 Claims, 12 Drawing Sheets

MAGNETIC CIRCUITS IN THE ROTATION SYSTEM FOR GENERATING BOTH THE MECHANICAL POWER AND THE ELECTRIC POWER

TECHNICAL FIELD

This invention relates to a magnetic circuit in a rotation system.

More particularly, this invention relates to a magnetic circuit in the rotation system obtaining a mechanical rotation power by transforming the electric energy into magnetic energy, and at the same time necessary electric and mechanical energy by transforming the four magnetic flux summed in one magnetic circuit into electric energy and mechanical energy: the flux generated from an induction electromagnet for magnetic flux circulation in am armature for generating the mechanical power, the flux generated from an induction electromagnet for magnetic flux circulation in am armature for generating the mechanical power, and the flux generated from the field magnet.

BACKGROUND ART

The revolving devices that have been invented so far can be categorized into three types: motors that generate revolving force by using electrical energy, generators that generate electric power by using mechanical power, and dynamotor which are made by mechanically or electrically connecting generators and motors.

In the above-mentioned revolving devices most of the cases tried to simply change the device structure in order to maximize the efficiency of output power versus input power. This effort, however, has not provided many results besides the fact that it has only removed the ripple phenomenon.

Figure 1:
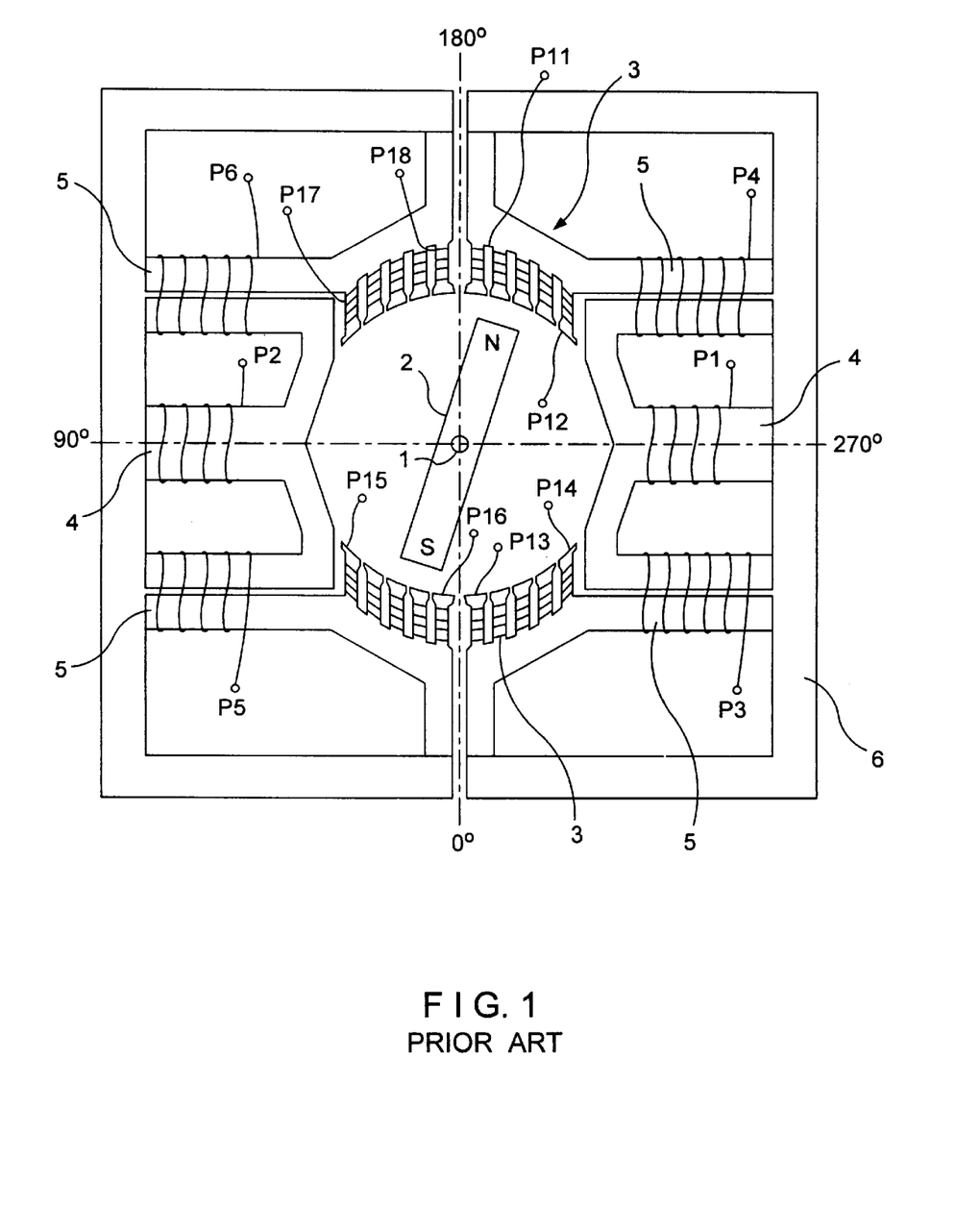
FIG. 1: The diagram of the magnetic circuit in the conventional rotation system for generating the mechanical and electrical power.

As one can see, efforts to maximize efficiency have always been made. One of these is the patent (Korean patent No: 90-382. Title of the invention: magnetic circuit and magnetic induction method of rotator for generating mechanical and electric power, Issuing date: Jan., 12, 1995) issued to this inventor. As described in FIG. 1, the invention is composed of revolving field magnet(2) which rotates with the attractive and repulsive force of the magnetic field, the armatures for generating the mechanical power(3) that are formed with the several coiled bolts which support rotation of the revolving field magnet(2), the coiled armatures for generating the electric power(4) which are made of conductors and are designed to receive the magnetic flux generated when the revolving field magnet(2) rotates, the induction electromagnet for magnetic flux circulation(5) which control the magnetic flux according to the rotational phase of the revolving field magnet(2), and the induction means for magnetic flux circulation which include the circulation conductor(yoke)(6) for circulating the magnetic flux induced on the induction electromagnet. Therefore, when the power source is connected to the input power lines (p1–p18) in the armatures for generating the mechanical power(3) and the induction electromagnet for magnetic flux circulation(5), rotational force of the revolving field magnet (2) is generated. At the same time, part of the flux induced at the induction electromagnet for magnetic flux circulation (5) in the armatures for generating the electric power(4) and the induction electromagnet for magnetic flux circulation(5) in the armatures for generating the mechanical power is used to get the rotational force of the revolving field magnet(2). Some of the remaining flux, the flux generated at the opposite side of the pole piece of the armatures for generating the mechanical power, first flows first through the induction electromagnet for magnetic flux circulation(5) in armatures for generating the mechanical power and the circulation conductor(yoke)(6), then flows through the induction electromagnet for magnetic flux circulation(5) in armatures for generating the electric power, and finally summed with the flux from movement of the above mentioned revolving field magnet to generate the electromotive force. In the end, the amount of energy return is equal to the amount of energy that remains after the loss of energy experienced by the electromotive force. The reason why we call it "energy return" is because the remaining amount of energy in the electromotive force after the loss is applied to part of the power input.

The above-mentioned rotation system, however, generates too much heat the product due of intensive winding on the armatures for generating the electric power when the system is loaded, and is not able to fully utilize the magnetic flux from the cross area of the revolving field magnet. In addition, a partial concentration of magnetic force from the armatures for generating the mechanical power in this system prevents from obtaining a uniform torque. As the intensive wound areas of the armatures for generating the electric power and of the electromagnet for inducing magnetic flux circulation per same area increase vertically, the flux magnetic flux does not increase due to the small area of the field magnet as much as shrinked by them.

Also, in the motor, as the speed increases, the counter electromotive force becomes bigger and repulses the input power this lowers the current into the coil of the armatures for generating the mechanical power. Hence, the torque becomes small as the speed increases.

SUMMARY OF INVENTION

This invention is to solve the above problems and has four objectives. The first objective is to provide the magnetic circuit of the rotation system that provides high efficient electromotive force by constructing the system in such a way that the several armatures for generating the electric power correspond to the cross area of the revolving field magnet. Thus the system effectively induces the magnetic flux of the revolving field magnet on to the several armatures for generating the electric power.

The second objective of this invention is to provide a magnetic circuit for the rotation system that provides a uniform torque by splitting the single pole piece into several ones in the armatures for generating the mechanical power.

The third objective is to provide a magnetic circuit for the rotation system that provides a high degree of efficiency by maximizing the amount of the magnetic flux of the field magnet. This can be done by properly splitting, into highly balanced areas, the electromagnets for inducting magnetic flux circulation in the armatures for generating the electric power and in the armatures for generating the mechanical power, and at the same time by optimizing the coil wind-up area of the electromagnets.

By winding together and winding individually the electromagnets for inducting magnetic flux in armatures for generating the electric power and the electromagnets for inducting magnetic flux circulation in the armatures for generating the mechanical power with the two electromagnets separated by an air gap; and by applying power to the electromagnets for inducting magnetic flux circulation according to the rotational phase of the revolving field magnet, one of the magnetic fluxes generates the electromotive force and the rest magnetic fluxes provide the rotational force.

The fifth objective is to provide a magnetic circuit for the rotation system that maintains or increases the torque regardless of an increase in the counter electromotive force induced by increasing rotational speed. By the electric load produced in countering the electromotive force generated in armatures for generating the electric power, the polarity of the pole pieces in the armatures for generating the electric power changes to the same polarity as the pole pieces in the armatures for generating the mechanical power. This will increase the mechanical force regardless of an increase in the counter electromotive force that is induced by increasing rotational speed.

According to the present invention there are provided; a rotatory means which is fixed at an axis and rotates by the repulsive and attractive magnetic field forces; a means for generating mechanical power which is composed of several projecting parts or slots in a circular stator and generates the magnetic force to the revolving field magnet to increase revolving movement, when the input power is applied to;

a means for generating the electric power that forms inside of the above-mentioned circular stator, which is placed alternatively with the above-mentioned armature for generating the mechanical power and generates the electromotive force by receiving the magnetic flux from the above-mentioned revolving field magnet and the above-mentioned armature for generating the mechanical power. Also, in order to control the magnetic flux flow according to the rotational phase of the revolving field magnet, a magnetic circuit in the rotation system for generating the mechanical and electric power is provided to offer the induction means for magnetic flux circulation that part of the above-mentioned means for generating the mechanical power and part of the above-mentioned means for generating the electric power are wound. Spaced with the air gap, with coil either in common or individually. Also, it provides a circulation conductor(yoke) for circulating the magnetic flux from the induction means for the magnetic flux circulation and from the means for generating electric power.

According to another aspect of the invention are provided; a rotatory means which is fixed at an axis and rotates by the repulsive and attractive forces of magnetic field; a means (armature) for generating the mechanical power that is composed of several projecting parts or slots in a circular stator and generates the magnetic force to the revolving field magnet to increase revolving movement, when the input power is applied to;

a means (armature) for generating the electric power that is formed inside of the above-mentioned circular stator, is placed alternatively with the above-mentioned means for generating the mechanical power, and generates the electromotive force by receiving the magnetic flux from the above-mentioned revolving field magnet and means for generating the mechanical power and its electromagnet for inducing the magnetic flux circulation.

Also a transformative means is the means in which the electromotive force produced at the means armature for generating the electric power increases the torque of the mechanical power by changing the polarity of the pole piece in the armature for generating the electric power when the system is loaded.

Also, in order to control the magnetic flux according to the rotational phase of the revolving field magnet, a magnetic circuit in the rotation system for generating the electric power provides the induction means for magnetic flux circulation that part of the above-mentioned means for generation the mechanical power and part of the above-mentioned means for generating the electric power are wound, spaced with the air gap, with coil either in common or individually. Also, it provides a circulation conductor (yoke) for circulating the magnetic flux from the induction means for the magnetic flux circulation and the means for generating the electric power.

BRIEF DESCRIPTION OF THE DRAWINGS

FIGS. 2A and 2B are As an embodiment of the present invention of the magnetic circuit in the rotation system for generating the electric power and the mechanical power.

DETAILED DESCRIPTION

Figure 2A:
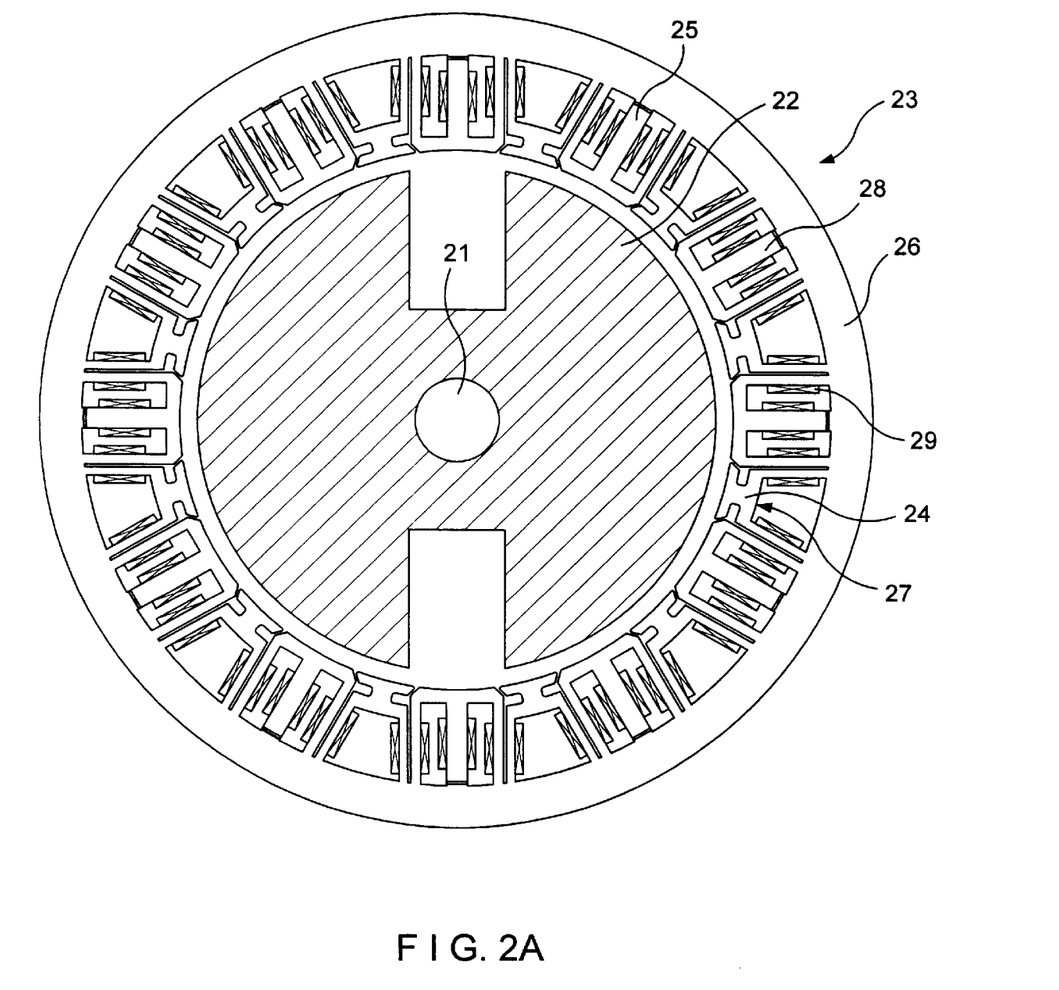
FIG. 2A is a diagram of an application example of inverse Y type armatures for the mechanical power
Figure 2B:
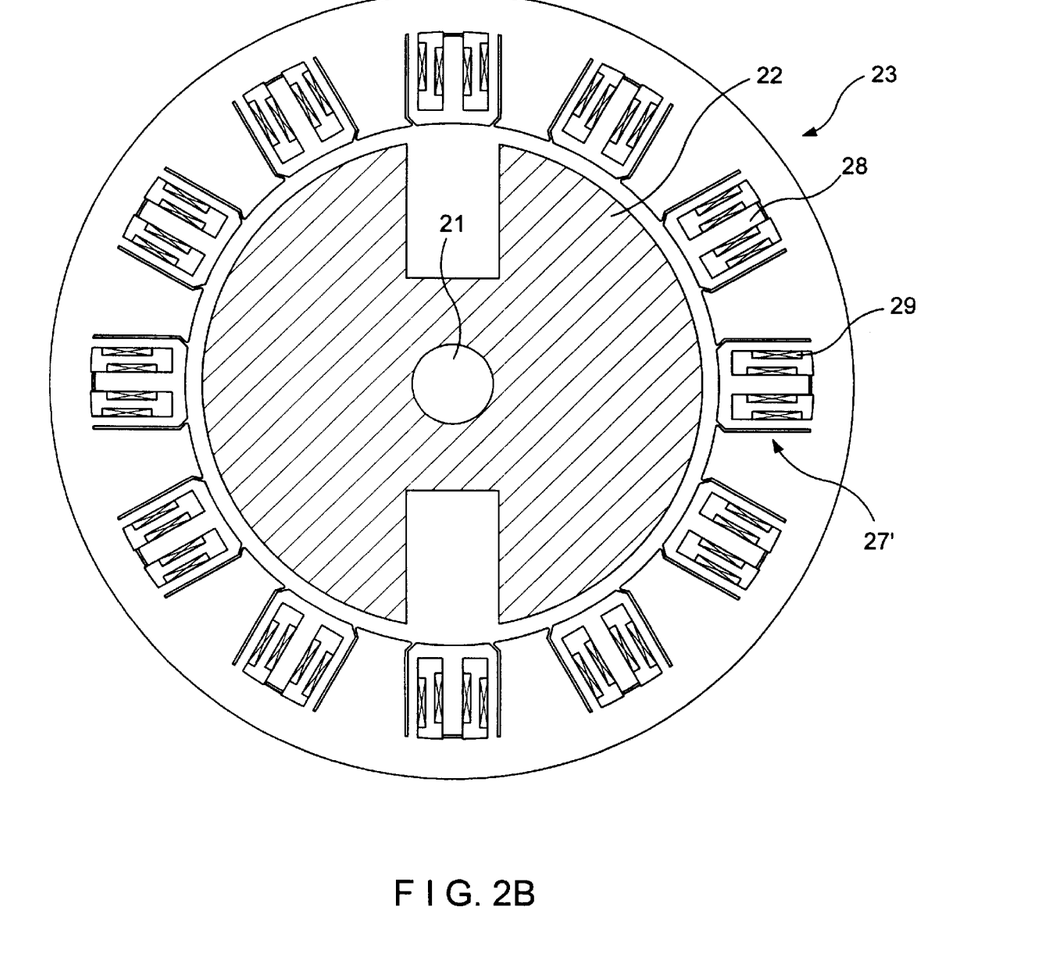
FIG. 2B is a diagram of an application example of I type armatures for the mechanical power.

FIGS. 2A and 2B illustrate the magnetic circuits in the rotation system for generating the electric power and the mechanical power in the present invention.

As shown in FIG. 2A, a revolving field magnet (22) is rotatable around a fixed axis (21) and a circular stator (23) includes the electromagnets (27) for inducing magnetic flux circulation in a leg of an inverse type core. A circulation conductor (yoke) (26), of the circular stator forms a magnetic circuit. This magnetic circuit is composed of three parts. One is the inverse Y type magnetic circuit on which coils (20) are wound for inducing magnetic flux circulation in an armature (24) for generating the mechanical power. The second is the projecting part of an M type magnetic circuit that, is spaced with an air gap, (38) from yoke (26) and is next to the inverse Y core of the electromagnet (27) for inducing magnetic flux circulation. Coils are wound on the M type core for generating electromotive force by receiving the magnetic flux from the revolving field magnet (22) and from the electromagnet (27) for inducing magnetic flux circulation in the armature (25) for generating the electric power. This generates magnetic flux circulation in coils (29) wound together on the leg of the inverse Y core and induces the flow of the magnetic flux. In order to complete the magnetic circuit, the air gap (28) exists between the circulation conductor (yoke) (26) and electromagnet (27) for inducing magnetic flux circulation in the armature (28) for generating the electric power. Coils (29) in the slots of the armature (24) for generating the mechanical power are included in this circuit in order to acquire a higher torque.

FIG. 2B is different in that FIG. 2B has I type magnetic circuit (27') rather than the inverse Y type described in FIG. 2A. Because there is no difference except for the above-mentioned one, we skip the explanation.

Figure 3A:
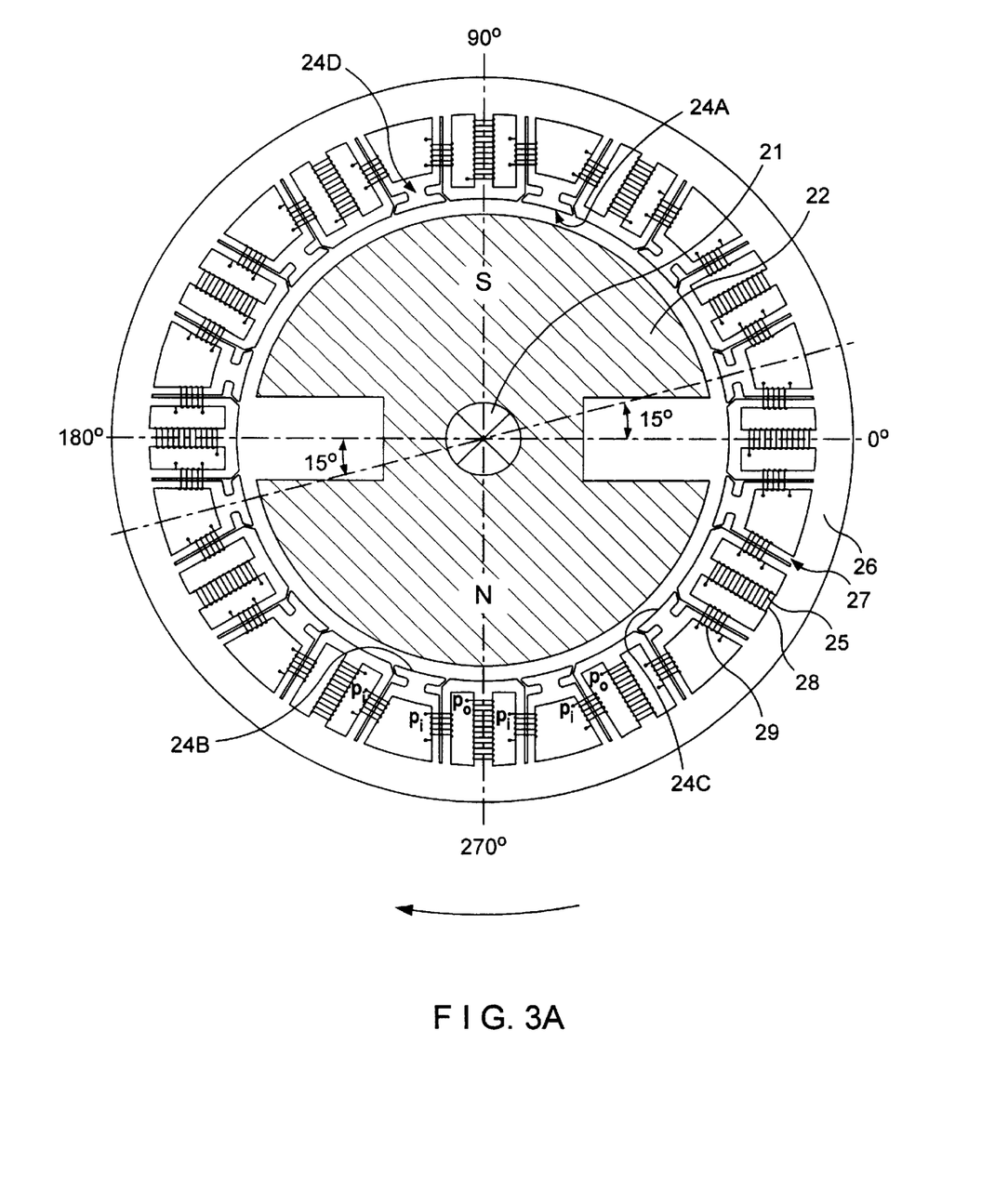
FIGS. 3A and 3B respectively a diagram indicating the operating state of an embodiment of the rotation system for generating the electrical power and the mechanical power in the present invention.
Figure 3B:
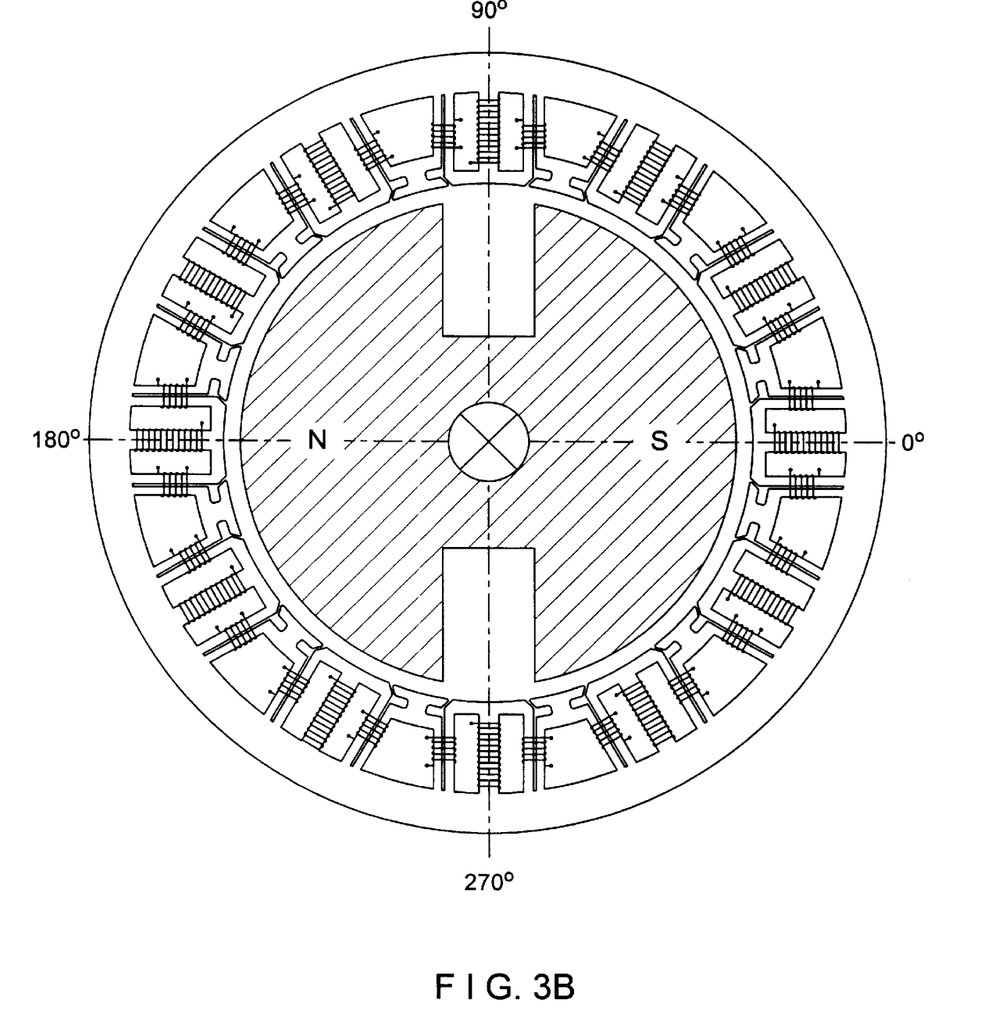

With reference to FIGS. 3A and 3B, we will explain the magnetic polarity change of the magnetic circuit for the revolving movement of the revolving field magnet. For the explanation, we take. the double-pole single phase case.

Figure 4A:
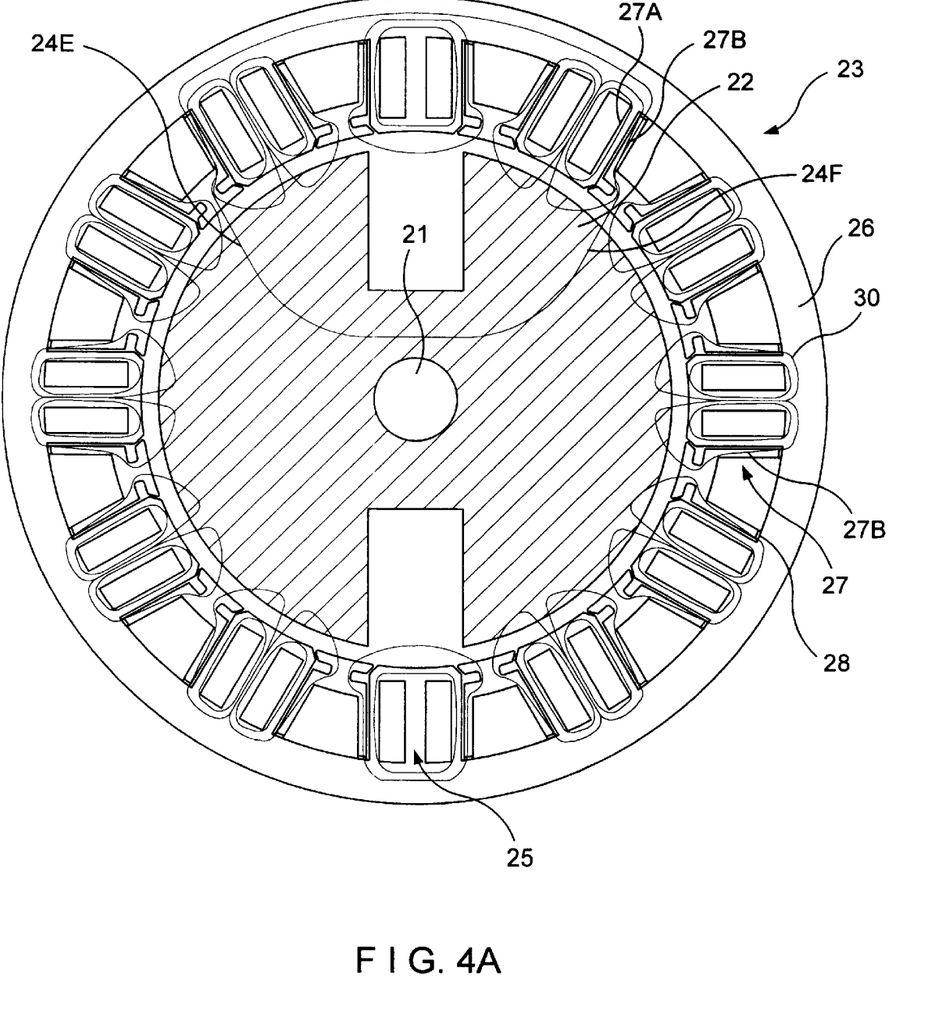
FIGS. 4A and 4B are a magnetic flux flow diagram of an embodiment of the magnetic circuits in the rotation system for generating the electric power and the mechanical power in the present invention.

As shown in FIG. 3A, when N pole and S pole of the revolving field magnet are at the vertical axis, switching power is applied as will be shown in FIG. 4A, according to the detected phase of the revolving field magnet by a sensor (not shown) for phase detection of the revolving field magnet fixed at the axis (21). This switching power causes the input line (pi) of the coil to induce N pole at the inverse Y type armature (24B) for generating the mechanical power positioned at the front point of N pole of the revolving field magnet (22) when it rotates clock-wise; to induce S pole at the inverse Y type armature (24A) for generating the mechanical power at the position of S pole of the revolving field magnet (22).

Also, the switching power induces N pole at the pole piece of the inverse Y type in the armature (24C) for generating the mechanical power positioned at 15° under the 0° line and S pole at the pole piece of the inverse Y type in the armature (24D) for generating the mechanical power positioned at 15° above the 180° line. In this way, we can get the initial rotational force.

As shown in FIG. 3B, the revolving field magnet(22) which acquired the initial rotation force can get a constant rotational armature for generating power according to the detected phase by the phase detection sensor (not shown) at the axis. Since the same explanation can be applied to the I type projecting structure of the armature for generating the mechanical power in FIG. 2B, we skip the I type case.

Figure 4B:
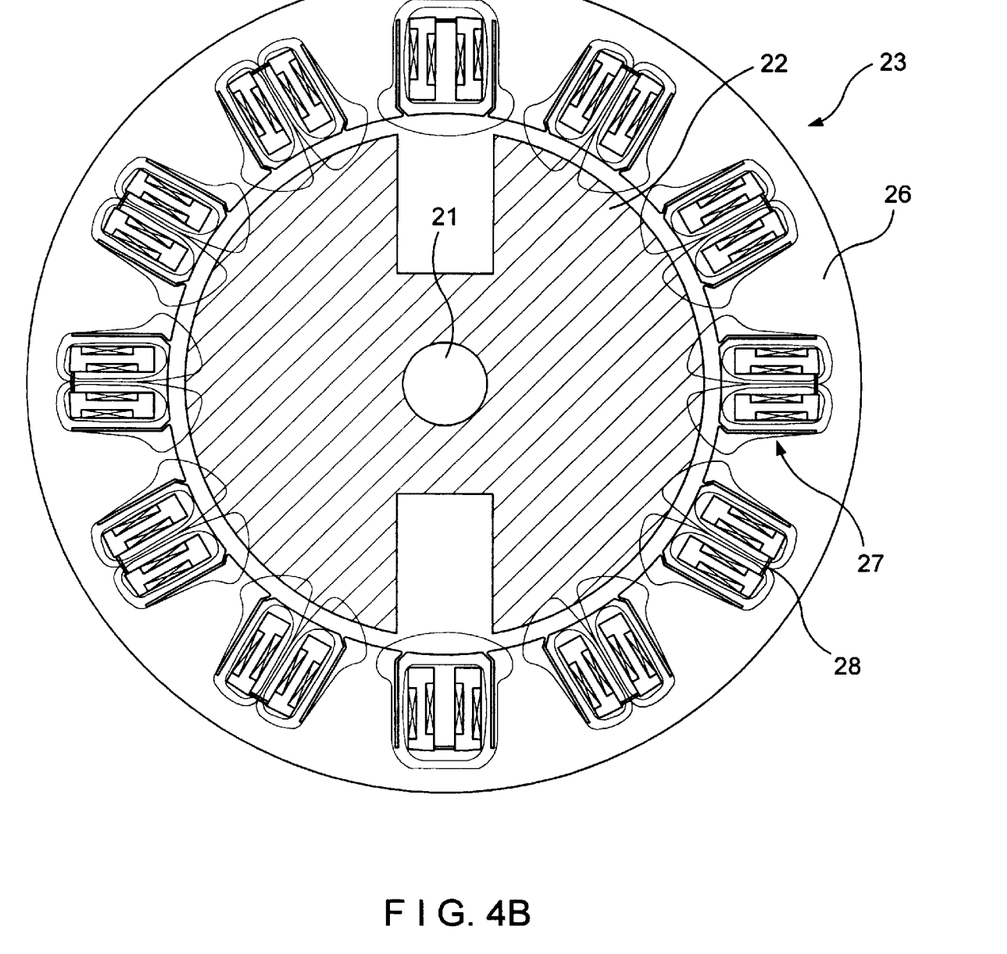

The magnetic flux flow diagram FIGS. 4A and 4B of the magnetic circuit shows the magnetic flux produced from the armature for generating the mechanical power (24E) when the power is applied to the armature. This magnetic flux follows the revolving field magnet (22) which travels past the armature for generating the mechanical power (24F) (opposite site of 24E), where power was transmitted from the switching circuit and forms a magnetic circuit along the path of circulation conductor (yoke) (26).

When power is applied to wound coils which are common to the leg (27B) of the armature for generating the mechanical power (24E) and the electromagnet (27A) for inducing magnetic flux circulation in armature (25), electric power is produced.

On the other hand, magnetic flux is also formed in a rotation which produces the mechanical power. Air gap (28) forms a magnetic circuit between the electromagnet (27) for inducing magnetic flux circulation [(27)] and the circulation conductor (yoke) (26).

When power is applied to coils (29) wound in common on the leg (27B) of the inverse Y type or I type armature for generating the mechanical power (24E) and the electromagnet (27A) for inducing magnetic flux circulation in the armature (25) for generating the electric power the intended magnetic flux is formed. Part of this magnetic flux is used to obtain the rotational force and the rest is used for generating the electric power. By cutting off the magnetic flux from the coils wound in the armature (25) for generating the electric power, the electromotive force is obtained. The magnetic flux from the revolving field magnet (22) also combines with the flux from the armature (25) for generating the electric power and the electromotive force increases.

Figure 5:
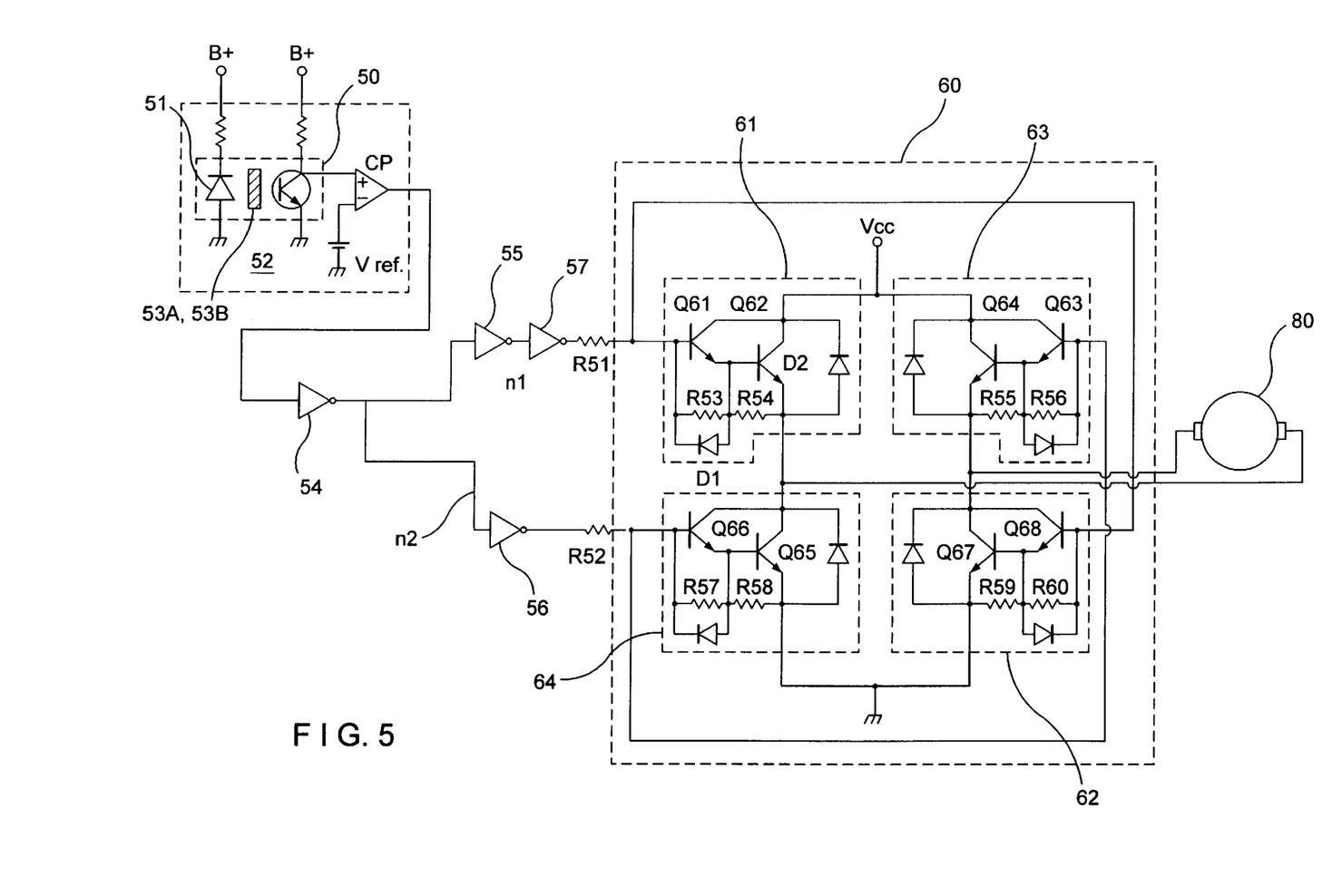
FIG. 5 is a diagram of a switching circuit used in the rotation system for generating the electric power and the mechanical power in the present invention.

FIG. 5 shows a diagram of an example of the switching power supply circuit which supplies the switching power to the rotator according the present invention.

As shown in FIG. 5, the circuit changes the polarity for every phase of about 90 degrees of the revolving field magnet. For this switching, the revolving field magnet phase detector (50) for detecting the phase of the revolving field magnet is used. Although it can be realized in various ways such as with resolvers and encoders, in the present invention, the revolving field magnet phase detector comprises a photo-diode (51), a photo-transistor (52), and a phase-detecting plate (53A, 53B) which detects the rotated angle of the revolving field magnet (22) is located between the photo-diode (51) and the photo-transistor (52).

This revolving field magnet phase detector (50) is connected to the switching power supply circuit (60) through several NOT logic devices(55, 56, 57, 58). In this way, two different outputs from the switching power supply (60) can be applied to the motor.

The switching power supply circuit (60) comprises first, second, third and fourth switching parts (61, 62, 63, 64) for providing the electric power to the rotation unit (80). Since each part (61, 62, 63, 64) has the same configuration, we describe only the first switching part (61). The first switching part (61) comprises darlington transistors (Q61, Q62), voltage-dividing resistors (R61, R62), and diodes (D61, D62) to prevent the switching voltage from reversing. And the transistors (Q61. Q62) of the first switching part (61) and the transistors (Q67, Q68) of the second switching part (62) are turned on at the same time. In the same way, the transistors (Q63 and Q64) in the third switching part (63) and the transistors (Q65, Q66) in the fourth switching part (64) are also turned on at the same time so that the rotation unit (80) is supplied with a switching pulse voltage of which phase is 90 degrees. Thus, the switching power supply circuit (60) changes the direction of the current applied to the coil of the armature (24) for generating the mechanical power and the coil of the armature (25) for generating electric power whenever the phase of the revolving field magnet (22) changes by every 90 degrees. The comparator (CP) of the above-mentioned revolving field magnet phase detector (50) compares the reference voltage Vref . applied to an inverting input terminal (−) with an output voltage of the phototransistor (52) applied to a noninverting input terminal (+).

The output of the photo-transistor (52) is generated if the light of the photo-diode(51) is transmitted caused by the phase angle detection from the phase-detecting plates (53A, 53B). In conclusion, the output of the above —mentioned switching power supply circuit, with alternatively changing its polarity, is supplied to the input line (pa') of coils in the rotation unit (80).

Figure 6A:
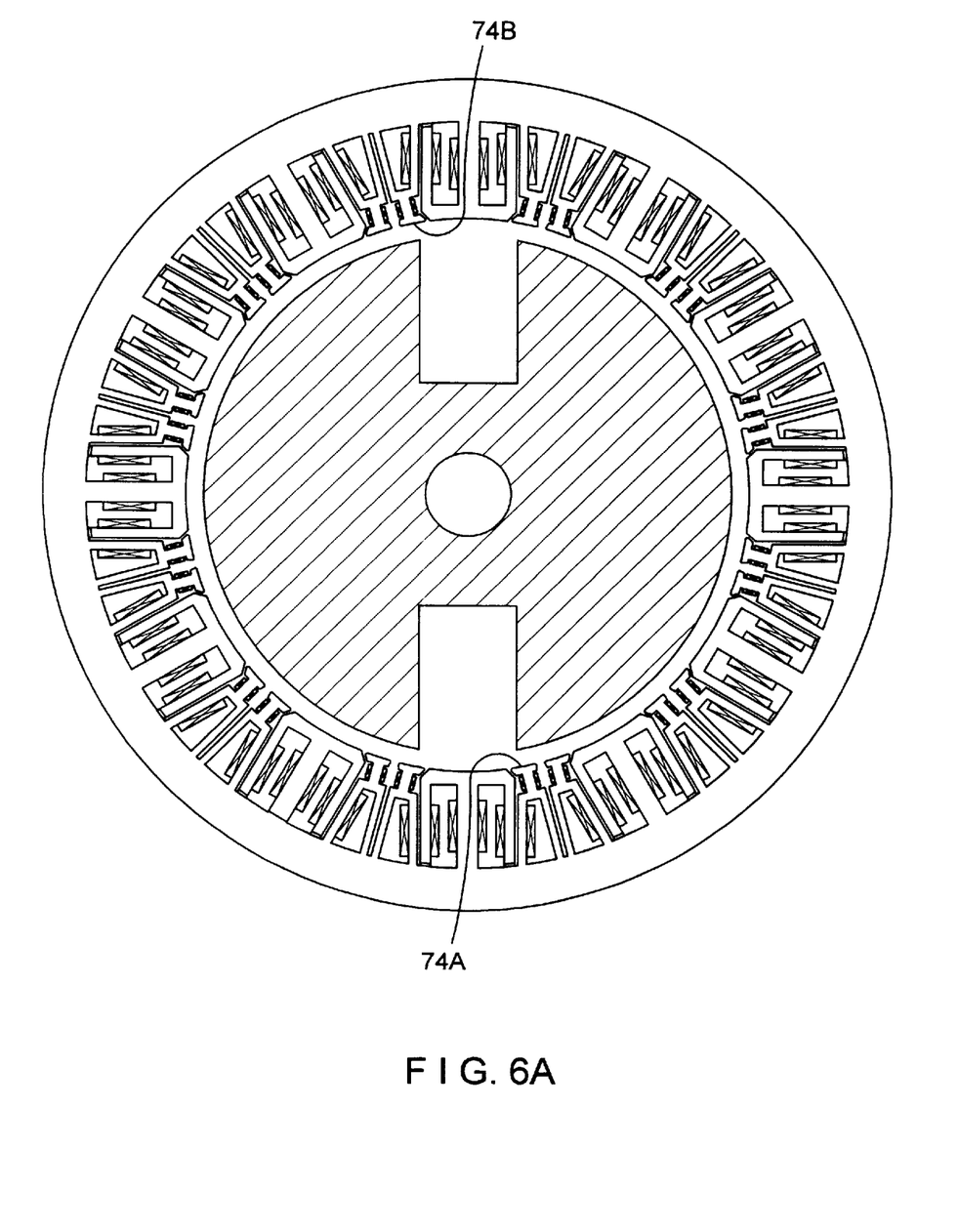
FIGS. 6A and 6B are an another embodiment of the magnetic circuits in the rotation system for generating the electric power and the mechanical power in the present invention, the structure diagram of H type and combination type of the inverse Y types of armature for generating power in pairs.
Figure 6B:
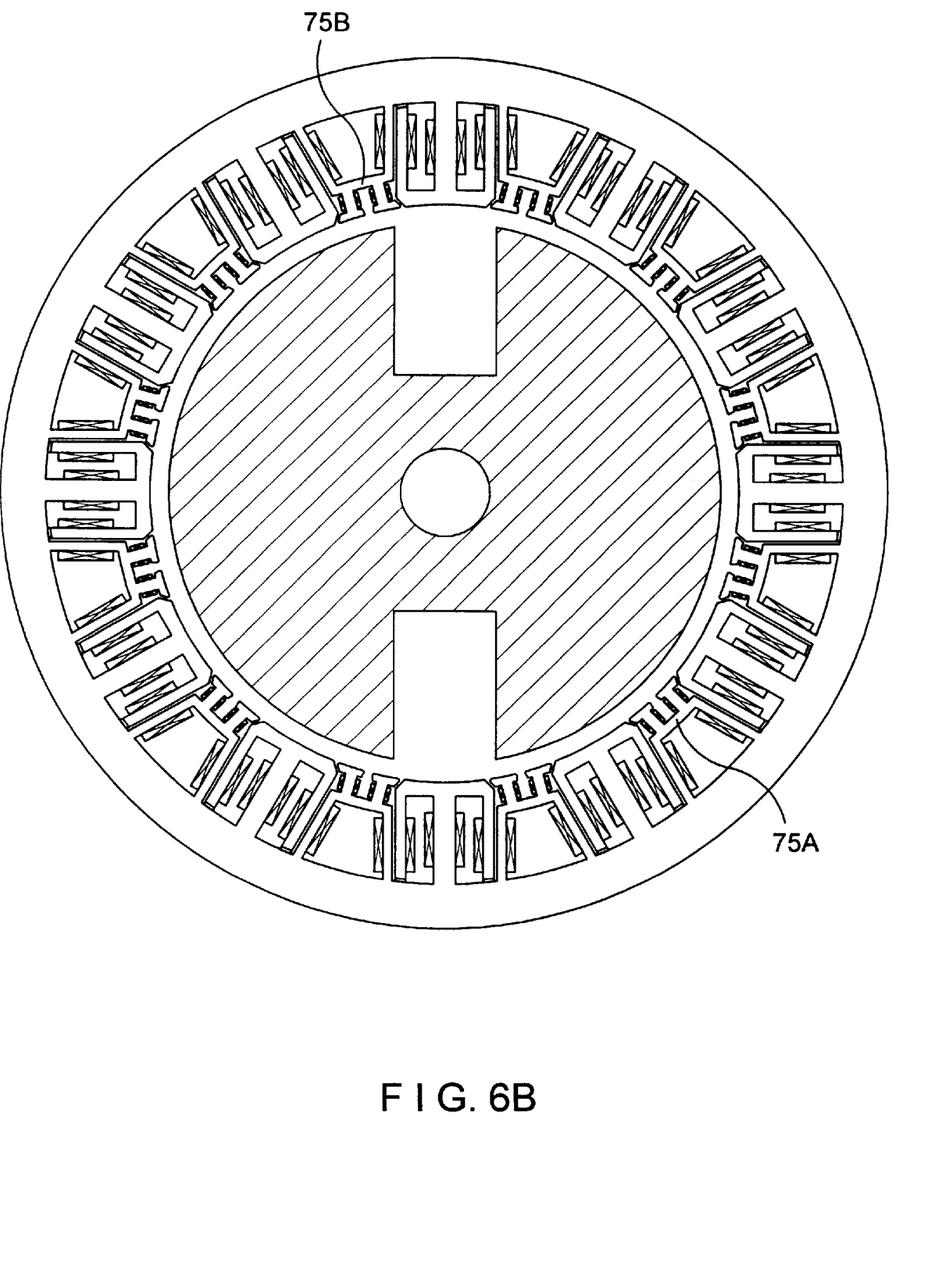

FIGS. 6A and 6B are magnetic circuit diagrams of another embodiment of the rotation system for generating the electric and mechanical power in the present invention. As shown in FIG. 6A, the structural difference from the above-mentioned embodiment is in the modification in the structure of the armature (74A, 74B) for generating the mechanical power. The modification includes the combination of 2 pairs or more of inverse Y type in order to induce the magnetic flux in the armature for generating the electric power and for the armature for generating the mechanical power when polarity change occurs, such as from S pole to N pole, from N pole to N pole, and from S pole to S pole and to smoothly rotate the revolving field magnet. Also, to increase the torque, a coil is wound at the neck of the armature (74A, 74B) for generating the mechanical power. If necessary, apparatuses on the armature may be added.

The difference in FIG. 6B from FIG. 6A is that the structure of the armature (75A, 75B) for generating the mechanical power is 'H' type. In these regards, 'H' type of the armature (75A, 75B) for generating the mechanical power may have an air gap vertically along the center so a different shape of armature i. e. a pair of symmetric 'F' type of armature can be formed and used for generating the mechanical power. With that one exception, the structure and the operation are the same. Also, the operation principle of FIG. 6A and 6B is the same as that of FIG. 3A and 3B. And, because the operation principles are almost the same and are self-evident to engineers in this field.

We skip the explanation of the operation.

Figure 7A:
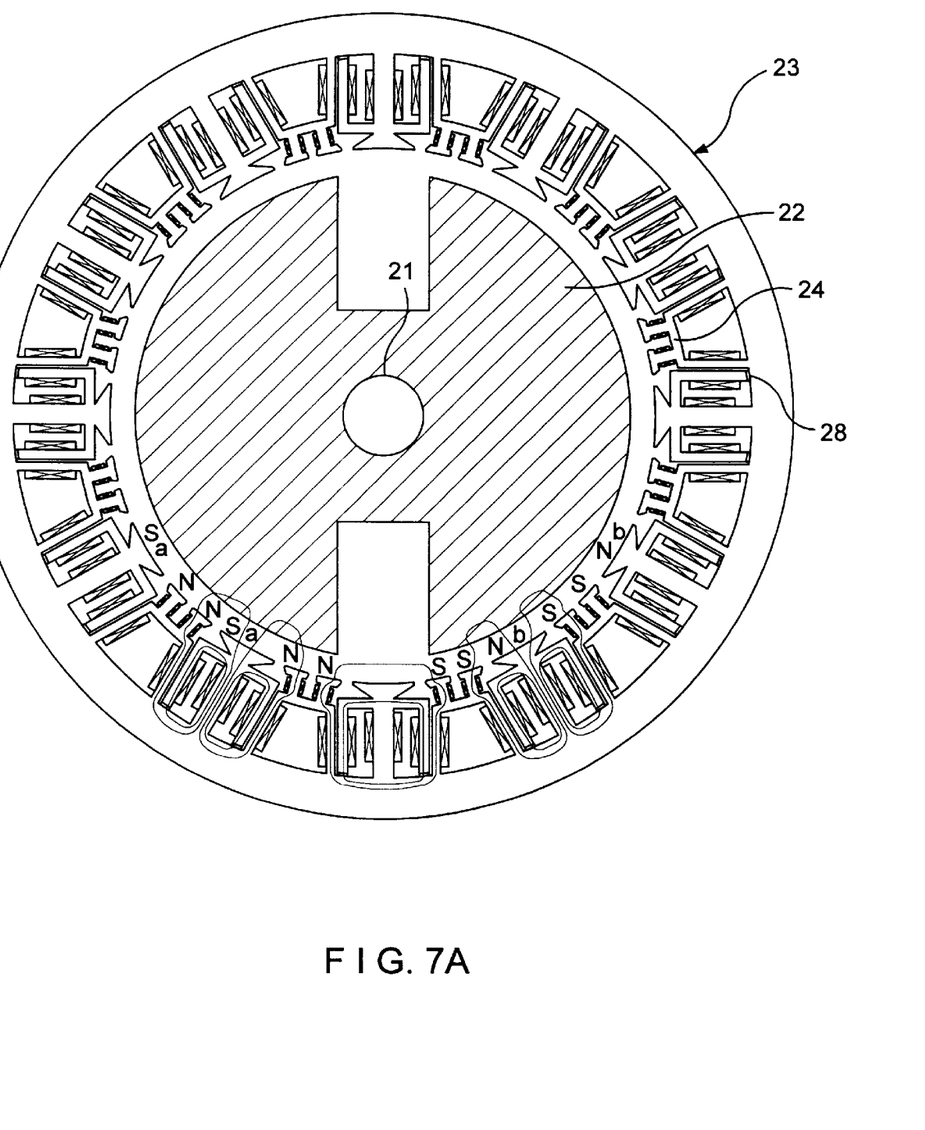
FIGS. 7A and 7B are a diagram of magnetic flux flow and the magnetic circuits of a transformative structure when the mechanical power is generated in the pole piece of the armature for generating the electrical power.

FIG. 7A shows that when N pole is induced at the pole piece (75) of the armature (74) for generating the mechanical power by inducing N pole at the neck (71) of the armature (74) for generating the mechanical power and the leg(72) of the electromagnet (72) for inducting magnetic flux circulation, a small S (Sa) pole is induced at the pole piece in the armature for generating the electric power which is not influenced by the mechanical rotational force.

Figure 7B:
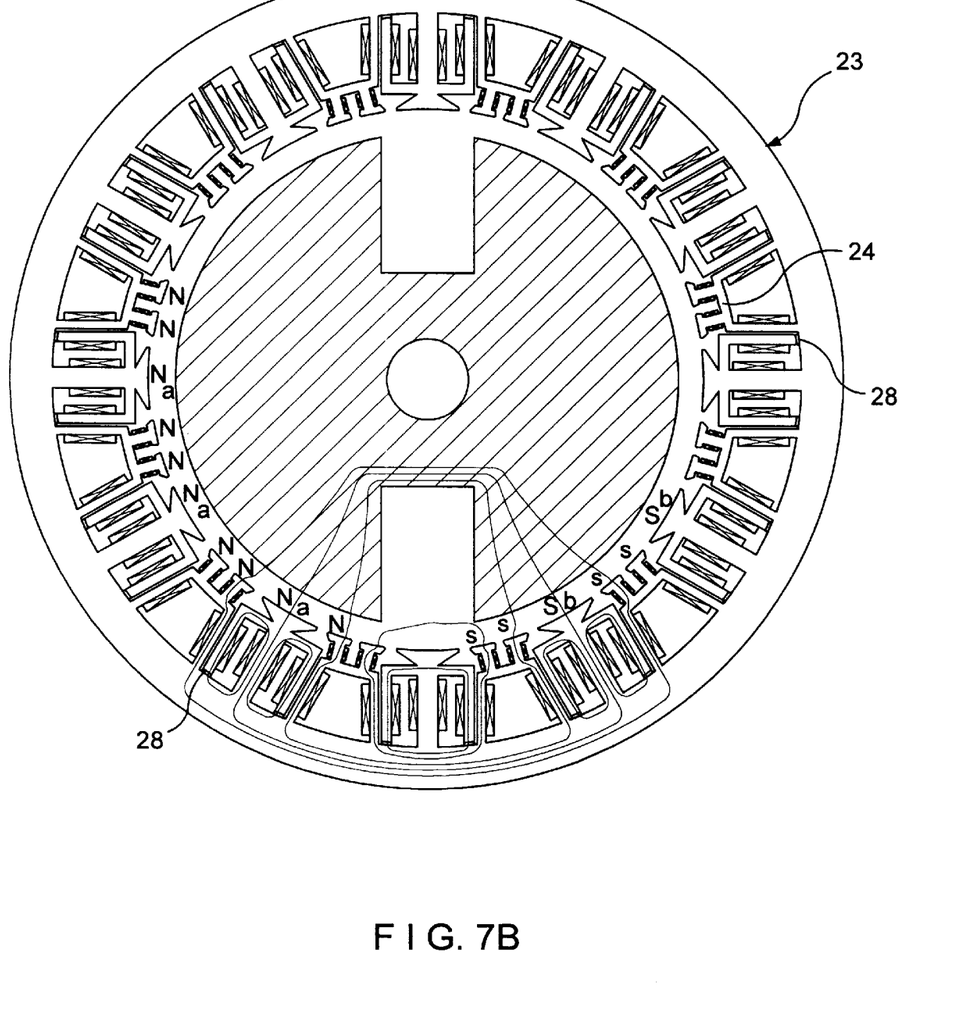

FIG. 7B shows that in the present invention the electromotive force is generated when the induced magnetic flux from the electromagnets for inducting magnetic flux circulation and from the rotation of the revolving field magnet are interlinked to the coils wound at the armature for generating the electric power. When this electromotive force is connected to electric load, the polarity at the pole piece of the armature for generating the electric power changes from small S (Sa) pole to N (Nb) pole according to the amount of the electromotive force and load. This presents a phenomenon of maintaining or increasing the torque even when the revolving field magnet rotates at a high speed.

This phenomenon can be explained using the equation of the relationship between the relationship between the number of rotations and the torque of a motor, Eb=Ia·Ra+Ec, where Eb is input electric power, Ia input current, Ra coil resistance, and Ec counter electromotive force.

In previous technology, as the number of rotations is increased, the counter electromotive force (Ec) is increased but the input current (Ia) inversely reduced. As a result, the mechanical torque reduces. In the present invention, however, when the system is loaded, the polarity (Nb) change (see FIG. 7) at the pole piece of the armature for generating the electric power maintains and increases the torque even when the number of rotations of the revolving field magnet increases.

As explained, the magnetic circuit of the rotation system for generating the mechanical and electric power generates the magnetic flux at the armature for generating the mechanical power and the armature for generating the electric power with the switching power from a drive circuit. These fluxes increase the rotational force of the revolving field magnet. At the same time, the electromotive force is generated because the armature for generating the electric power cuts the flow of the magnetic flux as the magnetic flux from the electromagnet for inducting magnetic flux circulation and from the revolving field magnet flow through the armature for generating the electric power. Therefore, through this process, the electromotive force is re-used as a part of electric power consumption in the rotation system and the energy saving effect to reduce consumption of external electric power occurs.

The rotation system in the present invention is explained with the example of double pole and single-phase type but the same explanation can also be applied to double pole three phase or multi-pole multi-phase case.

We use the concept of the revolving field magnet and the stator armature but the same explanation can be applied to a system of revolving armatures and stationary field magnets.

What is claimed is:

1. A magnetic circuit in a rotation system for generating mechanical and electrical power comprising:

a rotary means including a revolving field magnet which rotates about an axis by repulsive and attractive forces in a magnetic field;

a first electromagnet for generating mechanical power comprising a plurality of spaced projecting armature parts on a circular stator disposed uniformly around said revolving field magnet for generating magnetic force to cause a revolving movement of the revolving field magnet, when input power is supplied thereto, said armature parts extending uniformly on said stator in equally spaced relation over the entire 360° extent of said circular stator;

a second electromagnet for generating electric power disposed inside of said circular stator and including a plurality of spaced projection armature elements disposed uniformly over the entire 360° extent of said circular stator around said revolving field magnet in alternation with said projecting armature parts of said first electromagnet for generating mechanical power so that each of said projecting armature element is interposed between a respective pair of adjacent projecting armature parts of the first electromagnet uniformly over the entire 360° extent of the circular stator, said projecting armature parts of the first and second electromagnet, being distributed uniformly all around an inside surface of said circular stator; and a plurality of coils connecting each said projecting armature part of the first electromagnet to a respective adjacent said projecting armature element of said second electromagnet to produce electromotive force by receiving magnetic flux from said revolving field magnet and magnetic flux from said first electromagnet; and said coils being wound on said armature part and its respective adjacent said armature element and being connected to a magnetic flux circulation inducing means for controlling a summed magnet flux according to a rotational phase of the revolving field magnet, said magnetic flux circulation inducing means including a magnetic flux inducing conductor and a circulation conductor for circulating the flux from said magnetic flux induction conductor and from said second electromagnet.

2. A magnetic circuit in a rotation system in accordance with claim 1, wherein said means for generating mechanical power has a structure of inverse Y, I, H, U, T, F type, and of the magnetic circuit of the rotation system for generating the electrical and mechanical power said magnetic circuit of the rotation system for generating the electrical and mechanical power inducing a generation of rotation force by the provision of armatures for generating the mechanical power at a certain position of generating the electrical power.

3. A magnetic circuit in a rotation system in accordance with claim 1, wherein said means for generating electrical power comprises M, Y or T type conductors which attach to an 1, N, M or S type electromagnet for inducing magnetic flux circulation to the projection part of M, Y or T shape and a magnetic circuit of a rotator system for generating the mechanical and electrical power which includes an input and output power line which outputs the electromotive force to connection parts of the circulation conductors.

4. A magnetic circuit in a rotation system in accordance with claim 1, wherein said rotary means includes permanent magnets, electromagnets or super conductor magnets.

5. A magnetic circuit in a rotation system in accordance with claim 1, comprising a yoke for the circulation conductors and an air gap between the circulation conductors and the means for generating the mechanical power or the means for generating the electrical power.

6. A magnetic circuit in a rotation system in accordance with claim 1, wherein said means for generating the mechanical power acts to increase revolving force by inducing the magnetic flux using the armature elements for generating the electrical power and by increasing the magnetic flux from the armature parts for generating the mechanical power.

7. A magnetic circuit in a rotation system in accordance with claim 1, wherein said revolving field magnet defines a rotary path within said circular stator forming an air gap with said projecting armature parts and said projecting armature elements, said armature parts and said armature elements alternating uniformly entirely around said rotary path.

8. A magnetic circuit in a rotation system in accordance with claim 7, comprising coil windings wound on each said projecting armature part and its adjacent said armature element.

9. A magnetic circuit in a rotation system in accordance with claim 8, wherein the projecting armature parts of the means for generating mechanical power, are of inverted Y, I, H, U, T, or F shape.

10. A magnetic circuit in a rotation system in accordance with claim 8, wherein said projecting elements of said means for producing electrical power include legs adjacent to respective said armature parts of the means for generating mechanical power, said coil windings being wound on said legs and said armature parts adjacent thereto.

11. A magnetic circuit in a rotation system in accordance with claim 10, wherein said projecting armature parts are of Y shape and said projecting armature elements are of M shape.

12. A magnetic circuit in a rotation system in accordance with claim 10, wherein said projecting armature part is of Y shape and said projecting armature element is of M shape.

13. A magnetic circuit in a rotator system for generating electric power, comprising:
  a rotary means which rotates about an axis by repulsive attractive forces in a magnetic field;
  an armature for generating mechanical power, a circular stator surrounding said armature and including several projecting armature parts for generating a magnetic force in revolving field magnets on the rotary means to product revolving movement, when input power is applied to said armature;
  means for generating electrical power formed inside of said circular stator and including a plurality of spaced armature elements distributed inside said stator in equally spaced relation uniformly all around said stator, said armature parts of the means for generating mechanical power being distributed in equally spaced relation uniformly in alternation with said armature elements of the means for generating electrical power, to generate electromotive force by receiving the magnetic flux from the revolving field magnets and from the means for generating the mechanical power, said armature parts and said armature elements extending around the entire 360° extent of said circular stator in uniform alternation with one another such that each said armature part and armature element extends between adjacent respective said armature elements and said armature parts all around the entire 360° extent of the circular stator,
  a transformative means for producing mechanical power that increases torque of the generated mechanical power by changing the polarity of pole pieces in the armature elements for generating the electrical power when the system is loaded, and
  a magnetic flux circulation inducing means for controlling a summed magnetic flux according to the rotational phase of the revolving field magnets, said means including a magnetic flux induction controller and a circulation conductor for circulating the magnetic flux from said magnetic flux induction conductor and said means for generating electrical power.

14. A magnetic circuit in a rotation system in accordance with claim 13, wherein said revolving field magnet defines a rotary path within said circular stator forming an air gap with said projecting armature parts and said projecting armature elements, said armature parts and said armature elements alternating uniformly entirely around said rotary path.

15. A magnetic circuit in a rotation system in accordance with claim 14, comprising coil windings wound on each said projecting armature part and its respective adjacent said armature element.

16. A magnetic circuit in a rotation system in accordance with claim 15, wherein the projecting armature parts of the means for generating mechanical power, are of inverted Y, I, H, U, T, or F shape.

17. A magnetic circuit in a rotation system in accordance with claim 15, wherein said projecting elements of said means for producing electrical power include legs adjacent to respective said armature parts of the means for generating mechanical power, said coil windings being wound on said legs and said armature parts adjacent thereto.

* * * * *